E. B. STIMPSON.
RIVET.
APPLICATION FILED AUG. 26, 1907.

962,794.

Patented June 28, 1910.

Witnesses:
Robert Head
F. W. Springmeyer.

Edwin Ball Stimpson Inventor
By his Attorney E. W. Scherr Jr.

UNITED STATES PATENT OFFICE.

EDWIN BALL STIMPSON, OF NEW YORK, N. Y., ASSIGNOR TO EDWIN B. STIMPSON COMPANY, A CORPORATION OF NEW YORK.

RIVET.

962,794.  Specification of Letters Patent.  Patented June 28, 1910.

Application filed August 26, 1907. Serial No. 390,145.

*To all whom it may concern:*

Be it known that I, EDWIN BALL STIMPSON, a citizen of the United States, and a resident of the county of Kings, city and State of New York, have invented certain new and useful Improvements in Rivets, of which the following is a specification.

The rivet of my present invention is of improved construction and is applicable to a variety of uses such as a protective and anti-skidding device on automobile tires.

Figure 1:
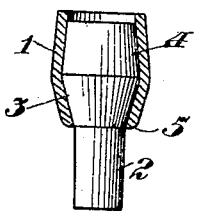
Figure 2:
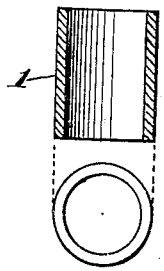
Figure 3:
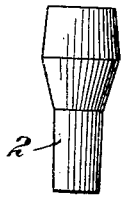
Figure 4:
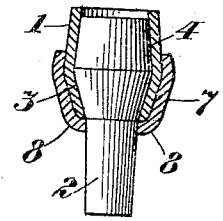

In the drawings, Figures 1 to 3 inclusive show stages in the manufacture of the completed rivet of Fig. 4 within my invention. Thus, Fig. 1 is a vertical mid-section, partly in elevation, of the respective parts shown in Figs. 2 and 3 assembled; Fig. 2 is a combined vertical mid-section and top plan view of the sleeve or wearing member, and Fig. 3 is a side elevation of the shank member, which, when assembled together, constitute the member, of Fig. 1; and Fig. 4 shows the completed rivet consisting of a cup-shaped member or rivet head combined with the structure of Fig. 1.

Describing now my invention with particular reference to the devices of the drawings and reserving it to the claims to point out the novel features, the construction shown in Fig. 1, consisting as already stated of an intermediate stage in the manufacture of the completed rivet of Fig. 4, is itself made up of the sleeve or annular wearing block 1 shown in Fig. 2, pressed into surrounding contact with the enlarged or plug portion of the shank member 2 of Fig. 3. It will be noted that the enlarged portion of the shank member is formed with reverse tapers 3 and 4 which unite to make its diameter largest at a point intermediate its top and bottom. Preferably, the sleeve or wearing block 1 will be made of a hardened steel, whereas the shank member will be made of soft iron or steel. Reversely, the member of Fig. 1 can be made by first bulging the sleeve outwardly at its center into the form shown in Fig. 1 (which in effect produces a flange at the inner end of the sleeve), and then swedging or spreading the shank member into the sleeve. To complete the rivet, the shank of the member of Fig. 1 is passed through the central opening in the bottom of a cup-shaped member or head 7, the sides of which are then pressed inwardly to grip the outside of the sleeve 1. This results in producing a recessed head for the reception of the wearing and shank members. Exteriorly, this cup has a rounding bottom 8 which, being the portion of the head of the completed rivet which contacts with the tire, serves to protect the tire against cutting by the rivet head.

When applied to the tire, the rim of the sleeve 1 projects outwardly to contact with the road and gives an excellent anti-skidding grip. Moreover, said rim persists during wear of the rivet because the sleeve, being hard, wears away less rapidly than the top of the soft metal shank head. In other words, the sleeve being hard and the shank within the sleeve soft, the latter will cup out during wear, thereby preserving at all times, a narrow ring of hard metal ideally adapted to grip the road.

That a perfectly new rivet may possess a contact face equally favorable for gripping the road, the top of the shank within the sleeve is preferably arranged from the start to be lower than the top edge of the sleeve.

Having thus described my invention what I claim is:

1. In combination a sleeve; a shank-member projecting from the sleeve having a portion located therein confined between portions of the sleeve against motion in either direction through it, and converging in contact with the sleeve's interior toward the projecting portion of the shank-member; and a cup rounded on its bottom adapted to contain the sleeve with the shank-member's projecting portion extending through a hole in the cup and with the cup at its sides closed in on the sleeve.

2. A rivet comprising a shank and a head provided with a wearing block, and a soft metal plug in the wearing face of the wearing block, substantially as described.

3. A rivet comprising a shank, a head provided with a recess, a wearing block secured in the head, and a soft metal plug in the wearing face of the wearing block, substantially as described.

4. A rivet comprising a wearing block having a flange on its inner edge, a head cup having its rim turned in over the flange, a shank extending through the wearing block and cup and provided with a flange clamped between the wearing block and the interior of the cup, substantially as described.

In witness whereof, I have signed my name to the foregoing specification in the presence of two subscribing witnesses.

EDWIN BALL STIMPSON.

Witnesses:
ROBERT H. THOMSON,
HARRY LONDON.